United States Patent [19]
Lee

[11] Patent Number: 5,737,287
[45] Date of Patent: Apr. 7, 1998

[54] METHOD FOR RECORDING/ REPRODUCING STATUS INFORMATION ON/FROM AN OPTICAL DISC

[75] Inventor: Soo Young Lee, Seoul, Rep. of Korea

[73] Assignee: LG Electronics Inc., Seoul, Rep. of Korea

[21] Appl. No.: 673,509

[22] Filed: Jun. 28, 1996

[30] Foreign Application Priority Data

Jun. 29, 1995 [KR] Rep. of Korea ............... 18284/1995

[51] Int. Cl.[6] .................................................. G11B 7/00
[52] U.S. Cl. ........................... 369/44.26; 369/58; 369/94
[58] Field of Search ................................. 369/58, 54, 50, 369/47, 48, 32, 94, 44.26, 44.31

[56] References Cited

U.S. PATENT DOCUMENTS

| | | | |
|---|---|---|---|
| 4,928,192 | 5/1990 | Bartlett et al. | 360/48 |
| 5,281,797 | 1/1994 | Tatsuno et al. | 369/117 |
| 5,416,757 | 5/1995 | Luecke et al. | 369/44.23 |
| 5,446,565 | 8/1995 | Komma et al. | 369/94 |

FOREIGN PATENT DOCUMENTS 361162865A 7/1986 Japan .
407296498A 11/1995 Japan .

*Primary Examiner*—Thang V. Tran
*Attorney, Agent, or Firm*—John P. White

[57] ABSTRACT

A method for deciding recording density of an optical disc easily decides and searches the kind and data recording status of a disc when reproducing a general CD and a high density CD. The method is performed by a recording step of recording classification of the general disc and the high density disc, and identification and recording density status of respective layers of the high density CD onto both a zero area of a lead-in region and a zero area of a Q channel of a subcode, and a reproducing step in which the zero area of the lead-in region is read out to decide the recording density status and positional information with respect to respective musics, and the linear velocity of the spindle motor, tracking servo and focusing servo are controlled with respect to the decided respective musics. Thus, it is easy to search the music while accurately controlling the spindle motor, focusing servo and tracking servo according to the recording density.

4 Claims, 5 Drawing Sheets

FIG.1
prior art

| MNR (00) | POINT | MIN | SEC | FRAME | ZERO | PMIN | PSEC | PFRAME |
|---|---|---|---|---|---|---|---|---|
| 8 | 8 | 8 | 8 | 8 | 8 | 8 | 8 | 8 |

← 72bit →

| music number | INDEX | music sections | | | | accumulative sum | | |
|---|---|---|---|---|---|---|---|---|
| | | min. | sec. | frame | | min. | sec. | frame |
| 00 | 01 | | | | | absolute start time of 1st music | | |
| 00 | 02 | | | | | absolute start time of 2nd music | | |
| 00 | 03 | | | | | absolute start time of 3rd music | | |
| ⋮ | ⋮ | | | | | ⋮ | | |
| | 99 | (untill 99th music) | | | | | | |
| 00 | A0 | | | | | absolute start time of 1st music | | |
| 00 | A1 | | | | | absolute time of final track | | |
| 00 | A2 | | | | | absolute time of lead out track start | | |

METHOD FOR RECORDING/ REPRODUCING STATUS INFORMATION ON/FROM AN OPTICAL DISC

BACKGROUND OF THE INVENTION

1. Field of the Invention

The present invention relates to a compact disc (hereinafter simply referred to as "CD"), and more particularly to a method for recording/reproducing on/from an optical disc, wherein respective codes resulting from a data recording method of a general CD mode, high density CD mode and a CD video (hereinafter referred to as "CDV") mode are recorded on a zero area of a lead-in region and a zero area in a Q channel format of a subcode for easily discriminating and searching the kind and a data recording status of a disc.

2. Description of the Prior Art

Generally, a data region is largely classified into a lead-in region, a main data region and a lead-out region in a CD.

Here, a data format of the lead-in region consists of 72 bits obtained by respective 8 bits as shown in FIG. 1, and the lead-in region is loaded with recording content of the disc.

More specifically, a reference letter "MNR" displays a music number represented by two columns of BCD (binary-coded decimal number), in which a reference number "00" denotes a lead-in track.

"POINT" designates the music number and lead-in and lead-out tracks, and "00~99" represent the music numbers.

"MIN, SEC and FRAME" represent areas for designating the playing time of respective musics from "01" to "99," so that the individual minute, second and frame order with respect to each music are displayed by means of the BCD of 2 digit.

"PMIN, PSEC and PFRAME" represent an absolute time of starting the music in a single sheet of disc, which respectively denote the minute, second and frame.

At this time, a zero area is not used.

In other words, the lead-in region is recorded with the number of musics recorded in the disc, each time of respective musics and total time, addresses corresponding to the initial position and an index portion of respective musics, which are named as table of contents (hereinafter referred to as "TOC").

Here, the lead-in region starts within 46 mm-diameter to continue just before a point of starting a program at 50 mm-diameter, and the TOC signal is repeatedly recorded in the lead-in region.

Also, since 4.32×10 bits stream across the disc per second, the data in the lead-in region finishes the lead-in within a considerably short time.

In addition, in a region recorded with the main data, as shown in FIGS. 2A and 2B, are alternately recorded with data and parity successively in one frame unit. At this time, a sync signal (of 24 bits) is recorded in the initial point of one frame, and, successively, a sub-coding symbol (of 24 bits), and 32 symbols (of 32×14 bits) of digital audio data and parity are loaded. Thus, 98 frames constitute one block.

Here, a single sheet of CD is partitioned into 99 to be recorded with 99 number of musics having a short length. Then, a CD player detects a P channel and a Q channel respectively from the subcode to play the program under the control of a servo section.

The subcode may be referred to as a user bit or control signal, which is provided for allowing a user to easily use the CD. The subcode is inserted one by one per frame.

In the subcode, the signal of the P channel is for displaying the existence of music, i.e., an interval between music and music, and the signal of the Q channel is for suggesting a fact that the content having a format the same as in the lead-in region is loaded for each frame of the main data region (refer to FIG. 3).

In FIG. 3, 2 bits (S0 and S1) denote the sync signal, and the control signal (of 4 bits) succeeding the sync signal denotes the channel number of the audio, existence of an emphasis, etc. The data region (of 72 bits) differs in accordance with address (of 4 bits), and a cyclic redundancy code (hereinafter referred to as "CRC") of 16 bits is an error detecting code which decides the right or wrong with respect to the received data of the Q channel to read out the right data only.

At this time, as a zero area of the lead-in data format, zero areas and are not employed in the Q code format, either.

Meanwhile, the disc is fabricated by mastering as shown in FIG. 4 to have a multi-layer for attaining the high density. At this time, in a disc fabricating system, (in order to accurately read out the data on the respective layers of the disc), an error of the disc can be eliminated only by continuously checking identification (ID) of respective layers.

In FIG. 4, a portion A denotes the lead-in region, B is the main data region and C is the lead-out region, respectively.

When viewed from the section of the disc as shown in FIG. 4, the data information, i.e., pit, can be formed by a double layer as (a) and (b), which may be formed by further layers.

In the general CD, the pit of the disc is 0.86 μm (3T) to the minimum to 3.18 μm (11T) to the maximum, and the track pitch is 1.6 μm. The lengths of the pitch and respective pits have been shortened along with the trend toward the accomplishment of the high density in the disc.

As the density of the disc is changed, the speed of a spindle motor should be changed, too. That is, a linear velocity in the general CD is 1.2 m/sec which should be slowed as the density is heightened at the high density.

Furthermore, in spite of the high density CD, the lead-in region is recorded in the upper layer (a) identical to the general CD format (having the track pitch of 1.6 μm and the pit of 0.86 μm(3T)~3.18 μm(11T)), and the other regions are decided as desired.

For example, it can be recorded in the high density such as:

layer (a) has double and layer (b) is to be quadruple, layer (a) is left unchanged and layer (b) is double, layer (a) is quadruple and layer (b) is unchanged and layer (a) is quadruple and layer (b) is quadruple.

However, since the disc has no part for representing the recording status or density during the high density recording, the general CD cannot be distinguished from the high density CD to make the search of the music difficult. Moreover, the focusing and tracking are not accurately carried out.

SUMMARY OF THE INVENTION

It is an object of the present invention to provide a method for recording a CD, wherein, for solving the foregoing problems, a general CD and a high density CD are classified during recording the CD, and IDs of respective layers are recorded in the zero area of a lead-in region and the zero area of a Q code in the high density CD for allowing the kind and data recording status of the disc to be accurately recognized, thereby facilitating the search of music.

It is another object of the present invention to provide a method for reproducing a CD capable of accurately controlling a linear velocity of a spindle motor, focusing servo and tracking servo in accordance with the kind of a disc.

To achieve the above object of the present invention, a method for recording/reproducing on/from an optical disc is carried out by a recording step of recording classification of a general disc and a high density disc, identification of respective layers of a multi-layer disc or recording density status onto both a zero area of a lead-in region and a zero area of a Q channel of a subcode. Then, a reproducing step is performed by reading out the zero area of the lead-in region to decide the recording density status and positional information with respect to respective musics, and controlling the linear velocity of the spindle motor, tracking servo and focusing servo with respect to the decided recording density status and positional information of respective musics.

BRIEF DESCRIPTION OF THE DRAWINGS

The above objects and other advantages of the present invention will become more apparent by describing in detail preferred embodiments thereof with reference to the attached drawings in which:

FIG. 1 shows a table representing a data format and recording data of a lead-in region in a general CD;

DETAILED DESCRIPTION OF THE PREFERRED EMBODIMENT

One embodiment of a method for recording/reproducing on/from a CD according to the present invention will be described in detail with reference to accompanying drawings.

Figure 2A:
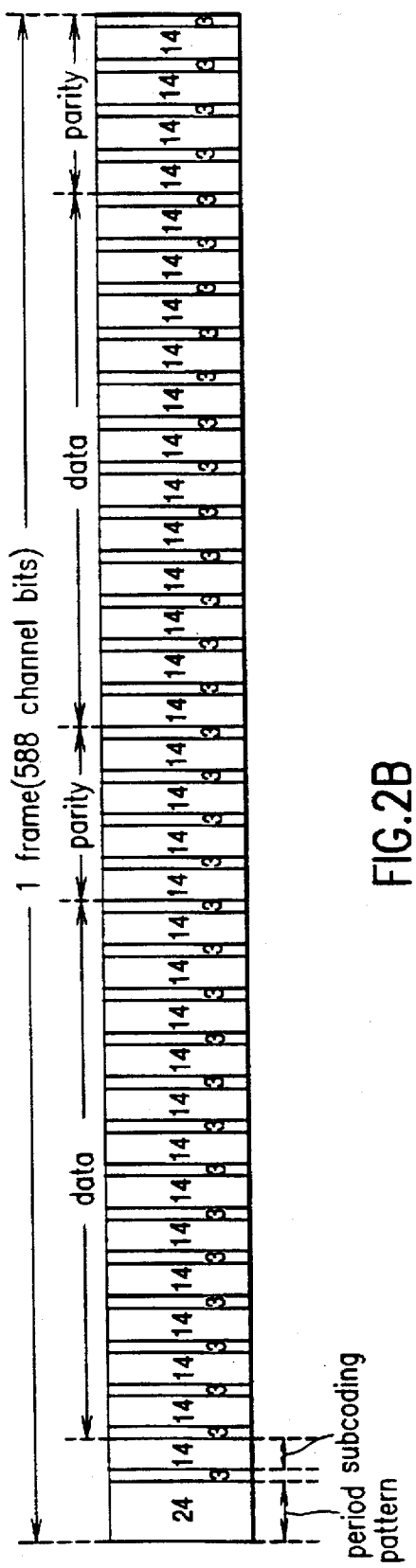
FIG. 2A is a view showing a frame format of a main data region of the general CD.
Figure 2B:
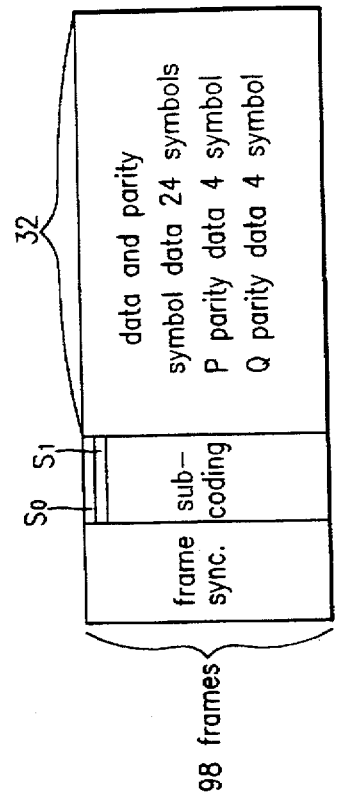
FIG. 2B is a view showing a subcoding format of a main data region of the general CD.
Figure 3:
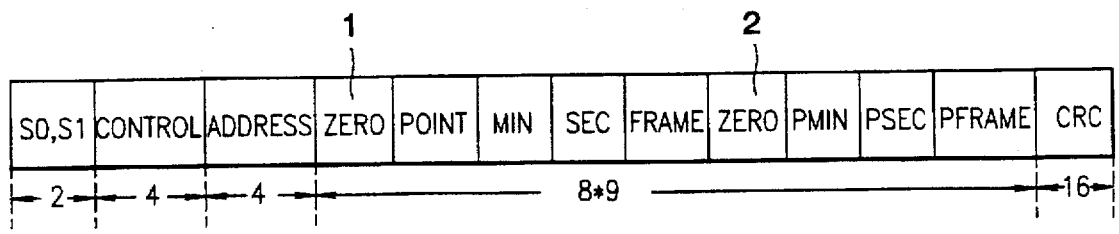
FIG. 3 is a view showing a data format of a Q channel in the subcoding shown in FIG. 2B.
Figure 4:
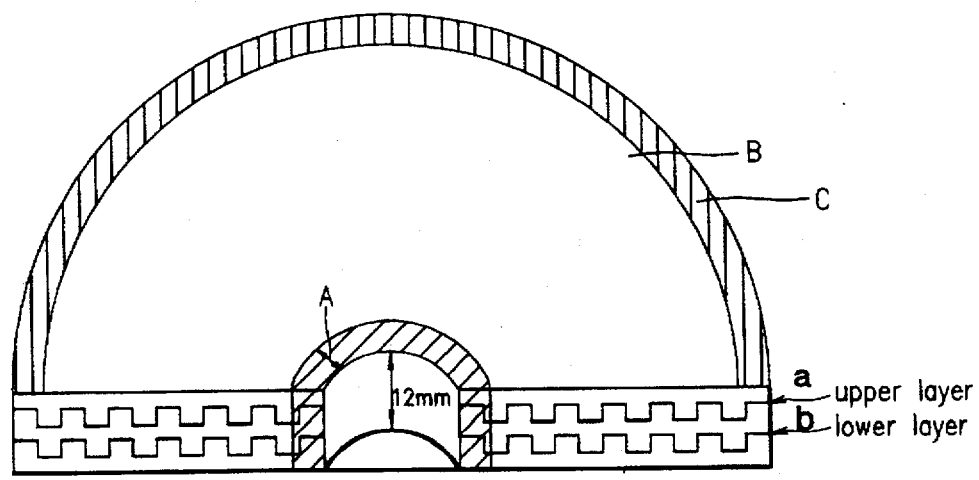
FIG. 4 is a schematic sectional view showing a major portion of a high density CD.
Figure 5:
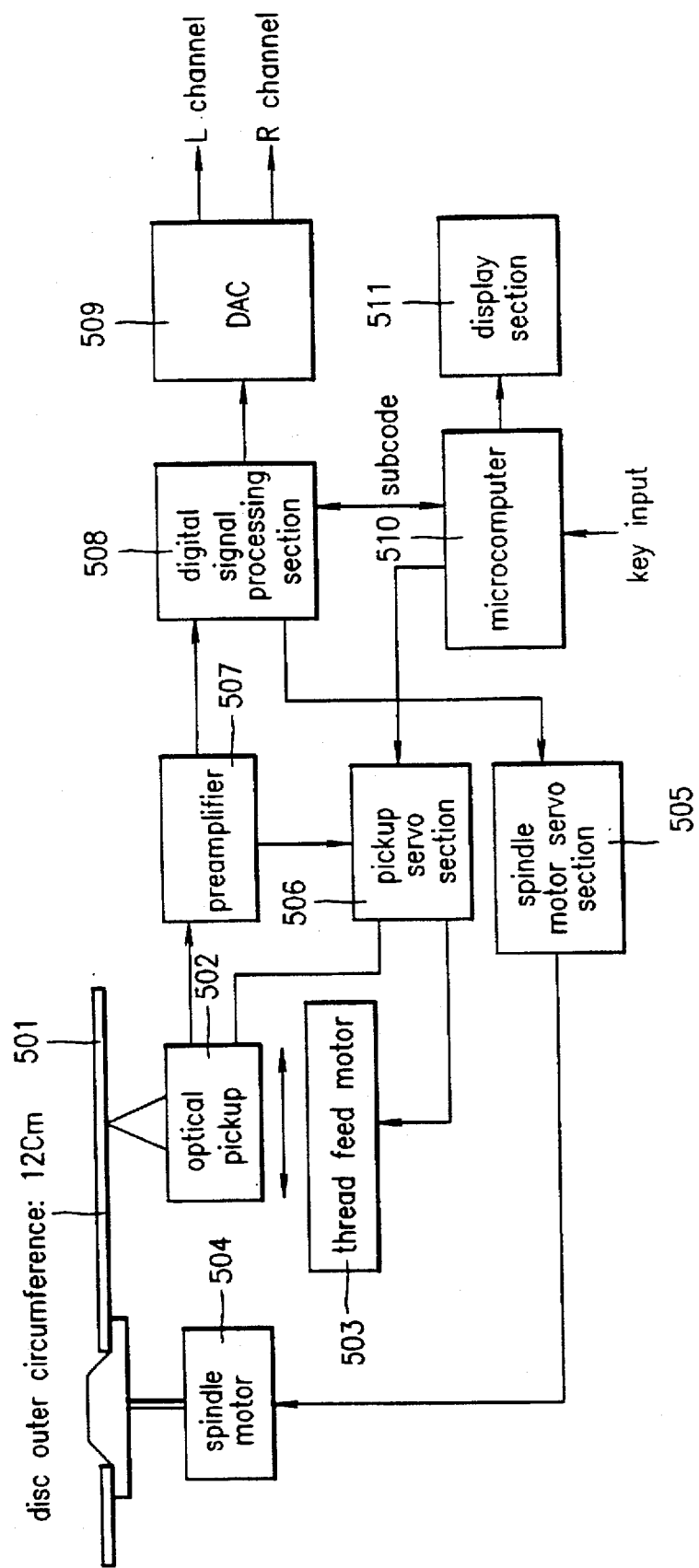
FIG. 5 is a block diagram showing a CD driving apparatus for performing the recording density judgment according to the present invention.
Figure 6:
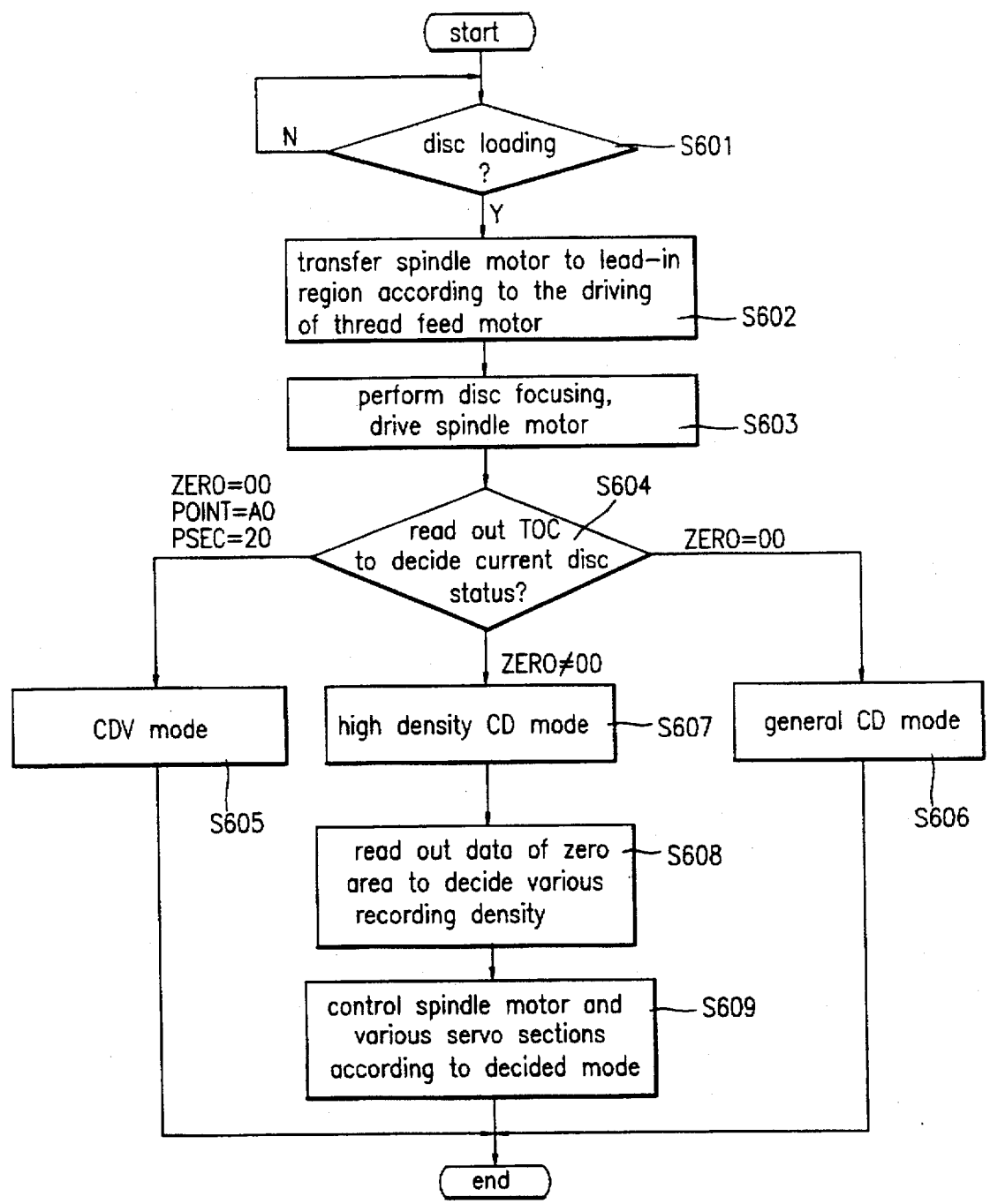
FIG. 6 is a flow chart for performing a method for recording/reproducing on/from the CD according to the present invention.

FIG. 5 is a block diagram showing a CD driving apparatus for performing the recording and reproducing includes an optical pickup 502 which radiates laser beam onto a designated position of a disc 501 to pick up reflected light. A thread feed motor 503 transfers overall optical pickup 502 in the radial direction, and a spindle motor servo section 505 controls a spindle motor 504 and drives disc 501 at a constant liner velocity (CLV). A pickup servo section 506 controls focusing for maintaining a constant distance with respect to a reflecting plane of disc 501 even though disc 501 is vibrated for pursuing a track having a minute pitch of approximately 1.6 µm in a non-contacting manner and a tracking for pursuing a designated track. A preamplifier 507 amplifies a signal picked up by optical pickup 502, eliminates a noise and a distortion rate of the signal to perform the waveform shaping. Then, in a digital signal processing section (hereinafter referred to as "DSP") 508, a signal related to the spindle servo is extracted from a signal supplied from preamplifier 507 to be fedback to spindle motor servo section 505, and data and subcode of a lead-in region is supplied to a microcomputer 510 while a signal processing operation is executed for restoring data. A digital/analog converter (hereinafter referred to as "DAC") 509 converts the data restored in DSP 508 into an analog signal to provide an audio signal corresponding to left L and right R channels, and a display section 511 displays the advancing status of the CD under the control of microcomputer 510.

The CD driving apparatus according to the present invention constructed as above records recording status and recording density of the disc respectively on the zero area of the lead-in data portion and the zero area of Q channel data of the subcode recorded for each frame (588 channel bit) when the CD is recorded.

In case of a general CD, '00' is written on the zero area. In case of a CDV, '00' is written in the zero area, 'A0' in a POINT area and '20' in a PSEC area. In case of a high density CD, 8 bits of the zero area is separated into the upper 4 bits and the lower 4 bits, so that the density status of the disc is binary-coded to be BCD prior to being recorded.

At this time, it may be designated such that the left 4 bits of the zero area is the number of layers, and the right 4 bits is the density.

In other words, the left 4 bits is recorded by 1 for the lower layer or 2 for the upper layer, and the right 4 bits is recorded by 0, 2 for double density and 4 for quadruple density in the general CD format.

Here, the setting and recording position of the data representing the kind or recording density of the disc must coincide when recording and reproducing, which can be differed in accordance with the program.

At this time, even in the high density CD, the lead-in region is recorded on upper layer (a) identical to the general CD format (having the track pitch of 1.6 µm and pits of 0.86 µm(3T)~3.18 µm(11T)), and the other regions are arbitrarily defined.

Consequently, when it is decided that disc 501 is inserted to be loaded (S601), microcomputer 510 drives thread feed motor 503 via pickup servo section 506 to transfer optical pickup 502 to the lead-in region (S602).

Also, the focusing servo for focusing onto the disc surface and the tracking servo for scanning optical beam upon the track to search out the track are carried out in pickup servo section 506. Simultaneously, spindle motor 504 is driven in the linear velocity of 1.2 m/sec under the control of spindle motor servo section 505, which is the same as the general CD (S603).

This is because the high density CD is also recorded with the lead-in region on the upper layer (a) in the format the same as the general CD.

When disc 501 is rotated at the above linear velocity, optical pickup 502 emits the laser beam upon a predetermined position of disc 501 to pick up the reflecting light therefrom.

The signal read out through optical pickup 502 is the analog signal of radio frequency which brightens the reflected light on a flat surface and darkens it on the pit portion. The analog signal is amplified in preamplifier 507 to eliminate the noise and distortion rate of the signal, and then the signal is waveform-shaped to be provided to DSP 508.

DSP 508 extracts the signal related to the spindle servo from the signal supplied from preamplifier 507 to feed back the extracted signal to spindle motor servo section 505. Then, the data or subcode read out from the lead-in region is supplied to microcomputer 510 while performing the signal processing for restoring the data. Successively, the data signal-processed via DSP 508 is converted into the analog signal in DAC 509 and provided as the audio signal corresponding to the left and right channels.

Here, since the lead-in region in the high density CD is recorded on the upper layer of the disc having the same format as the general CD, the focusing is executed by transferring the optical pickup to the lead-in region for any discs. Then, by driving spindle motor 504 in the speed of 1.2 m/sec identical to the general CD, the TOC recorded within the disc can be read out.

Accordingly, microcomputer 510 reads out the TOC to recognize the zero area of the TOC and judge the status of the disc (S604).

In other words, it is decided as the CDV mode when the POINT area is 'A0' and PSEC area is '20' while the zero area of the TOC is '00' (S605), and it is decided as the general CD mode when zero area is '00' (step 606). In addition, it is decided as the high density mode when the zero area is not '00' (S607).

If it is decided as the high density CD mode in step S607, the left 4 bits and right 4 bits of the zero area are read out to decide the recording density and position information with respect to respective musics in the disc (S608).

In more detail, it is decided as the general CD when the zero area is '00;' as the general CD format on the upper layer for '20;' as double density on the lower '23;' as double density on the upper layer for '22,' etc.

Thus, the recording density status and position information of respective musics are perceivable.

After this, the tracking servo and focusing servo of spindle motor 504 are carried out via spindle motor servo section 505 and pickup servo section 506 in accordance with the decided mode (S609).

In other words, the pit of the disc is set to 0.86 μm (3T) to minimum and 3.18 μm (11T) to maximum, and the track pitch is 1.6 μm in the general CD. But the pitch and respective pit lengths are shortened together with attaining the high density, Therefore, while the recording density is changed, the speed and servo of the spindle motor should be differed.

Consequently, the linear velocity is controlled to be 1.2 m/sec in the general CD, and is slowly controlled in the high density.

In addition, the above-mentioned recording density status and position information of the data are recorded in the zero area of the Q channel in the subcode recorded per frame (588 channel bits), so that the focusing and tracking are accurately performed in accordance with the recording density.

In the method for recording the CD according to the present invention as described above, the classification of the general CD from the high density CD, the IDs of respective layers and the recording density status of respective layers are recorded on both zero area of the lead-in region and zero area of the Q channel in the subcode in the high density CD. Thus, the kind and data recording status of the disc can be recognized accurately during reproducing the CD.

As a result, the method for reproducing the CD according to the present invention facilitates the search of music, and the spindle motor, focusing servo and tracking servo are accurately controlled in accordance with the decided recording density, thereby enhancing reliability of the optical pickup apparatus.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for recording on an optical disc comprising the step of recording status information including classification information with respect to a general disc and a high density disc, identification of respective layers of a multi-layer disc and recording density of said respective layers onto a specific area of a data format.

2. A method for recording on an optical disc as claimed in claim 1, wherein a lead-in region of said high density disc is recorded with a variety of status information on an upper layer of the data format the same as the general compact disc.

3. A method for recording/reproducing on/from an optical disc for transferring a thread motor to transfer a pickup upon the insertion of said disc, and driving a spindle motor at a linear velocity while performing a tracking servo and a focusing servo to decide the kind and recording density status of said disc, said method comprising:

a recording step of recording status information including classification of a general disc and a high density disc, identification of respective layers of a multi-layer disc and recording density status onto both a zero area of a lead-in region and a zero area of a Q channel of a subcode; and a reproducing step of reading out said zero area of said lead-in region to decide said recording density status and positional information with respect to respective musics, and controlling said linear velocity of said spindle motor, tracking servo and focusing servo with respect to the decided recording density status and positional information of respective musics.

4. A method for recording/reproducing on/from an optical disc as claimed in claim 3, wherein said reproducing step is performed by deciding said zero area of said Q channel of said subcode recorded for each frame to accurately perform said tracking servo and focusing servo.

* * * * *